United States Patent [19]
Yokoyama et al.

[11] Patent Number: 5,978,800
[45] Date of Patent: Nov. 2, 1999

[54] METHOD OF SEARCHING DATA FOR A GIVEN CHARACTER STRING

[75] Inventors: Kunio Yokoyama; Hidetoshi Nakanishi; Ryuichi Miyazaki, all of Kyoto, Japan

[73] Assignee: Dainippon Screen Mfg. Co., Ltd., Kyoto, Japan

[21] Appl. No.: 09/041,796

[22] Filed: Mar. 13, 1998

[30] Foreign Application Priority Data

Mar. 14, 1997 [JP] Japan ................................ 9-061049

[51] Int. Cl.⁶ .................................................. G06F 17/21
[52] U.S. Cl. .................... 707/5; 707/3; 707/6; 707/513; 707/516; 707/529
[58] Field of Search .................................. 707/3, 4, 5, 6, 707/104, 513, 529, 2, 516

[56] References Cited

U.S. PATENT DOCUMENTS

| 5,517,640 | 5/1996 | Tsuchiya et al. | 707/5 |
| 5,519,857 | 5/1996 | Kato et al. | 395/600 |
| 5,519,865 | 5/1996 | Kondo et al. | 395/600 |
| 5,598,557 | 1/1997 | Doner et al. | 707/5 |
| 5,778,361 | 7/1998 | Nanjo et al. | 707/5 |
| 5,787,421 | 7/1998 | Nomiyama | 707/5 |

*Primary Examiner*—Jean R. Homere
*Attorney, Agent, or Firm*—McDermott, Will & Emery

[57] ABSTRACT

An upper search on data to be searched is performed with a different condition from partial matching of a character string, and data items narrowed down thereby are counted. Then, it is determined whether the number of items obtained by counting is not more than the predetermined number of searchable items by partial matching Ls, and in relation to search results, a lower search is performed by partial matching of the character string.

8 Claims, 14 Drawing Sheets

---

```
17065 PHOTO DATA ITEMS FOUND ARE NOW NARROWED DOWN

THE PREVIOUS SEARCH CONDITION IS
        · KEYWORD: JAPANESE FOOD

ADD SEARCH CONDITION(S)
(TITLE CAN BE ADDED TO THE SEARCH CONDITION FOR THE NARROW-DOWN
SEARCH)
   ☑ KEYWORD
         ┌─────────────────────────────────┐
         │ JAPANESE FOOD                   │
         └─────────────────────────────────┘
         ※ SEPARATE KEYWORDS BY SPACE
         ◉ ALL KEYWORDS INCLUDED(AND SEARCH)
         ○ ANY KEYWORD INCLUDED(OR SEARCH)

☐ TITLE
         ┌─────────────────────────────────┐
         │                                 │
         └─────────────────────────────────┘
         ※ SEPARATE TITLES BY SPACE
         ※ ENTER WITH KATAKANA WHEN ENTERING PRONUNCIATION OF
            THE TITLE
         ◉ ALL TITLES INCLUDED(AND SEARCH)
         ○ ANY TITLE INCLUDED(OR SEARCH)

☐ PUBLICATION DATE
         ※ ENTER DATE AS IN THE FOLLOWING FORMAT
         · APRIL,1,1996 → 1996/4/1
         ┌──────────┐ ┌───────┐ ┌──────────┐
         │          │ │LATER▼│ │          │
         └──────────┘ └───────┘ └──────────┘
              ┌────────────────────┐ ┌───────┐
              │ START TO NARROW DOWN│ │ CLEAR │
              └────────────────────┘ └───────┘

■ DOWNLOAD KEYWORD
```

| (Fr) | (Ls) | (Ld) |
|---|---|---|
| 80 | : 0 | : 0 |
| 60 | : 5000 | : 150 |
| 40 | : 10000 | : 300 |
| 20 | : 15000 | : 1000 |
| 0 | : 30000 | : 2000 |

FIG. 5

| (Fp) | (Ls) | (Ld) |
|---|---|---|
| 15 | : 0 | : 0 |
| 10 | : 5000 | : 150 |
| 8 | : 10000 | : 300 |
| 5 | : 15000 | : 1000 |
| 0 | : 30000 | : 2000 |

- KEYWORD SEARCH CONDITION: ◉ COMPLETE MATCHING ○ PARTIAL MATCHING
- SEARCH RANGE: ◉ ALL FIELDS ○ PRESENT GENRE
- DISPLAY TYPE: ◉ ICON ○ LIST
- MAX NUMBER OF DISPLAYABLE
  ITEMS OF SEARCH RESULTS: [20 ▼]

ENTER SEARCH CONDITION(S)

☑ KEYWORD

[                              ]
(SEPARATE KEYWORDS BY SPACE)
◉ ALL KEYWORDS INCLUDED(AND SEARCH)
○ ANY KEYWORD INCLUDED(OR SEARCH)

☐ PUBLICATION DATE

※ ENTER DATE AS FOLLOWS:
· APRIL,1,1996 → 1996/4/1

[          ] [LATER ▼] [          ]

[SEARCH START] [ CLEAR ]

■ DOWNLOAD KEYWORD

F I G. 10

- KEYWORD SEARCH CONDITION: ◉ COMPLETE MATCHING  ○ PARTIAL MATCHING
- SEARCH RANGE: ◉ ALL FIELDS  ○ PRESENT GENRE
- DISPLAY TYPE: ◉ ICON  ○ LIST
- MAX NUMBER OF DISPLAYABLE
  ITEMS OF SEARCH RESULTS: [20 ▼]

ENTER SEARCH CONDITION(S)

☑ KEYWORD
[ ETHNIC FOOD ]
(SEPARATE KEYWORDS BY SPACE)
◉ ALL KEYWORDS INCLUDED(AND SEARCH)
○ ANY KEYWORD INCLUDED(OR SEARCH)

☐ PUBLICATION DATE
※ ENTER DATE AS FOLLOWS:
· APRIL,1,1996 → 1996/4/1
[        ] [LATER ▼] [        ]

[SEARCH START] [CLEAR]

■ DOWNLOAD KEYWORD

FIG. 11

KEYWORD: ETHNIC FOOD

*341* PHOTO DATA ITEMS ARE FOUND WHICH SATISFY THE ABOVE CONDITION

PAGE: 1/18

*20* OF 1ST TO *20*TH ITEMS BEING DISPLAYED

IKA WITH CONDIMENT | IKA WITH CONDIMENT | IKA WITH CONDIMENT | IKA WITH CONDIMENT

IKAFE | IKAFE | IKAFE | IKAFE

UGOJIKU SOUP | UGOJIKU SOUP | UGOJIKU SOUP | UGOJIKU SOUP

ONMEN | ONMEN | ONMEN | ONMEN

KAORIFE | KAORIFE | KAORIFE | KAORIFE

NARROW DOWN

PAGE : (1)(2)(3)(4)(5)(6)(7)(8)(9)(10)(11)(12)(13)(14)(15)(16)(17)(18)

FIG. 12

- KEYWORD SEARCH CONDITION: ○ COMPLETE MATCHING ● PARTIAL MATCHING
- SEARCH RANGE: ● ALL FIELDS ○ PRESENT GENRE
- DISPLAY TYPE: ● ICON ○ LIST
- MAX NUMBER OF DISPLAYABLE
  ITEMS OF SEARCH RESULTS: [20 ▼]

ENTER SEARCH CONDITION(S)

☑ KEYWORD
[ JAPANESE FOOD ]
(SEPARATE KEYWORDS BY SPACE)
● ALL KEYWORDS INCLUDED(AND SEARCH)
○ ANY KEYWORD INCLUDED(OR SEARCH)

☐ PUBLICATION DATE
※ ENTER DATE AS FOLLOWS:
· APRIL,1,1996 → 1996/4/1
[        ] [LATER ▼] [        ]

[SEARCH START] [CLEAR]

■ DOWNLOAD KEYWORD

FIG. 13

《SEARCH RESULTS》

KEYWORD: JAPANESE FOOD

*17065* PHOTO DATA ITEMS ARE FOUND WHICH SATISFY THE ABOVE CONDITION.
ADD/CHANGE THE SEARCH CONDITION TO NARROW DOWN THE PHOTO DATA ITEMS.

|NARROW DOWN|

FIG. 14

*17065* PHOTO DATA ITEMS FOUND ARE NOW NARROWED DOWN

THE PREVIOUS SEARCH CONDITION IS
      · KEYWORD: JAPANESE FOOD

ADD SEARCH CONDITION(S)
(TITLE CAN BE ADDED TO THE SEARCH CONDITION FOR THE NARROW-DOWN SEARCH)

☑ KEYWORD

| JAPANESE FOOD |

※ SEPARATE KEYWORDS BY SPACE
◉ ALL KEYWORDS INCLUDED(AND SEARCH)
○ ANY KEYWORD INCLUDED(OR SEARCH)

☐ TITLE

| |

※ SEPARATE TITLES BY SPACE
※ ENTER WITH KATAKANA WHEN ENTERING PRONUNCIATION OF THE TITLE
◉ ALL TITLES INCLUDED(AND SEARCH)
○ ANY TITLE INCLUDED(OR SEARCH)

☐ PUBLICATION DATE

※ ENTER DATE AS IN THE FOLLOWING FORMAT
· APRIL,1,1996 → 1996/4/1

[         ] [LATER ▼] [         ]

[START TO NARROW DOWN] [CLEAR]

■ DOWNLOAD KEYWORD

FIG. 15

*17065* PHOTO DATA ITEMS FOUND ARE NOW NARROWED DOWN

THE PREVIOUS SEARCH CONDITION IS
        · KEYWORD: JAPANESE FOOD ADD SEARCH CONDITION(S)
(TITLE CAN BE ADDED TO THE SEARCH CONDITION FOR THE NARROW-DOWN SEARCH)

☑ KEYWORD
        [ JAPANESE FOOD ]
        ※ SEPARATE KEYWORDS BY SPACE
        ⦿ ALL KEYWORDS INCLUDED(AND SEARCH)
        ○ ANY KEYWORD INCLUDED(OR SEARCH)

☑ TITLE
        [ UDON ]
        ※ SEPARATE TITLES BY SPACE
        ※ ENTER WITH KATAKANA WHEN ENTERING PRONUNCIATION OF THE TITLE
        ⦿ ALL TITLES INCLUDED(AND SEARCH)
        ○ ANY TITLE INCLUDED(OR SEARCH)

☐ PUBLICATION DATE
        ※ ENTER DATE AS IN THE FOLLOWING FORMAT
        · APRIL,1,1996 → 1996/4/1
        [    ] [LATER▼] [    ]

[ START TO NARROW DOWN ] [ CLEAR ]

■ DOWNLOAD KEYWORD

FIG. 16

KEYWORD: JAPANESE FOOD

TITLE: UDON

*334* ITEMS OF PHOTO DATA ARE FOUND WHICH SATISFY THE ABOVE CONDITIONS

PAGE: 1/17

*20* OF 1ST TO *20*TH ITEMS BEING DISPLAYED

TENPURA UDON    TENPURA UDON    TENPURA UDON    UDON

UDON            UDON            UDON            UDON

UDON-SUKI       UDON-SUKI       UDON-SUKI       UDON-SUKI

UDON-SUKI       UDON-SUKI       UDON-SUKI       UDON-SUKI

UDON-SUKI       UDON-SUKI       UDON-SUKI       UDON-SUKI

NARROW DOWN

PAGE : (1)(2)(3)(4)(5)(6)(7)(8)(9)(10)(11)(12)(13)(14)(15)(16)(17)

METHOD OF SEARCHING DATA FOR A GIVEN CHARACTER STRING

BACKGROUND OF THE INVENTION

1. Field of the Invention

The present invention relates to data searching methods, and more specifically to a data searching method by partial matching of a character string.

2. Related Art Statement

A data search by partial matching of a character string means that when a character string S is given as a search condition to a database in which N data items having a character-string-type attribute value M are registered, a data item whose attribute value M includes the character string S is selected therefrom. Conventionally, when this kind of search is executed, it is verified whether "the attribute value M includes the character string S" for each of N data items registered in the database.

However, in the above searching method, it has to be verified whether "the attribute value M includes the character string S" N times. Therefore, for example, when a database which registers a large amount of data more than hundred thousand items is searched, it disadvantageously requires extremely long time to complete the search.

Therefore, conventionally, before searching by partial matching of a character string to verify whether "the attribute value M includes the character string S", a search is performed with another search condition C capable of faster searching, thereby narrowing down data to be searched by partial matching of a character string.

For example, consider the case where a photo data item of "Udon" (a kind of Japanese noodles) is selected from a database in which photo data items of food menu are registered. In each photo data item, in addition to the name of the menu such as "Tempura-udon", "Udon-suki (Sukiyaki with Udon)", "Soba (another kind of Japanese noodles)", "Curry", "Fried rice", etc, indexes are further included indicating distinctions such as "Japanese", "Western", "Chinese"; "Noodles", "Rice", etc. Before the photo data item including the character string of "Udon" in the title is selected from this database, processing of extracting a photo data item including the index indicating, for example, "Noodles", is performed (an index search is extremely fast compared to a search by partial matching of a character string). Data to be searched by partial matching of a character string is thereby narrowed down, resulting in saving time required to complete the search.

However, how much time required to complete the search is saved depends on which condition to be selected as the above search condition C. For example, in the case of searching for "Udon", it is expected that the time required to complete the search will be different between when the data to be searched is narrowed down to "Noodles" and when the data to be searched is narrowed down to "Japanese". Therefore, in the above searching method, at worst, the data to be searched cannot be narrowed down at all. In this case, the time to complete the search is not saved. Further, even if an appropriate condition is selected, when the number of data items N registered in the database is large, the number of applicable items to be searched obtained by narrowing down with the search condition C becomes large, also resulting in long time for searching.

SUMMARY OF THE INVENTION

Therefore, an object of the present invention is to provide a data searching method capable of always sufficiently saving time required to complete searches at the time of searching data by partial matching of a character string, and as a result performing a quick search for a database in which a large amount of data is registered.

The present invention has the following features to achieve the object above.

A first aspect of the present invention is directed to a method of searching data for searching a database in which a plurality of data items are accumulated and extracting a data item including a given character string, which comprises the steps of:

performing an upper search on data items to be searched based on a condition which is different from partial matching of the character string;

counting the data items to be searched which are narrowed down by the upper search;

determining whether the number of the data items to be searched which are narrowed down obtained by counting is not more than the prescribed number of searchable items by partial matching; and performing a lower search by partial matching of the character string in relation to a result obtained by determining whether the number of the data items to be searched which are narrowed down is not more than the number of searchable items by partial matching.

As described above, in accordance with the first aspect, prior to a search by partial matching of a character string, an upper search with a condition which is different from partial matching of the character string is performed, thereby narrowing down data to be searched. Then the narrowed-down data items to be searched are counted to be compared to the prescribed number of searchable items by partial matching, and as a result, when the number of data items to be searched which are narrowed down is not more than the number of searchable items by partial matching, a lower search is performed by partial matching of the character string. This can always save time required to complete searches.

According to a second aspect, in the first aspect, the number of searchable items by partial matching is the number such that the lower search can be completed within a predetermined time.

As described above, in accordance with the second aspect, the number of searchable items by partial matching is the number such that the lower search can be completed within a predetermined time, thereby sufficiently saving time required to complete searches.

According to a third aspect, in the second aspect, the method further comprises the step of setting the number of searchable items by partial matching in relation to a current operating ratio of a CPU which performs the lower search.

As described above, in accordance with the third aspect, the number of searchable items by partial matching is selected in accordance with the current operating ratio of the CPU, thereby preventing time required to complete the lower searches from becoming long as a result of heavy loads on the CPU.

According to a fourth aspect, in the second aspect, the method further comprises the step of setting the number of searchable items by partial matching in relation to the current number of search processes being executed by the CPU which performs the lower search.

As described above, in accordance with the fourth aspect, the number of searchable items by partial matching is selected in accordance with the number of search processes which the CPU is currently executing, thereby preventing time required to complete the lower searches from becoming long as a result of simultaneous execution of many search processes.

According to a fifth aspect, in the first aspect, the method further comprises the steps of:

counting the data items to be searched which are further narrowed down by the lower search;

determining whether the number of the data items to be searched which are further narrowed down obtained by counting is not more than the prescribed number of displayable items; and displaying data of search results in relation to a result obtained by determining whether the number of the data items to be searched which are further narrowed down is not more than the number of displayable items.

As described above, in accordance with the fifth aspect, the data items further narrowed down by the lower search by partial matching of a character string are counted to be compared to the prescribed number of displayable items, and as a result, when the number of data items to be searched which are further narrowed down is not more than the number of displayable items, data display of search result is performed. This can always save time required to complete displays.

A sixth aspect is directed to a recording medium which records a program to be executed in a computer apparatus for searching a database in which a plurality of data items are accumulated and extracting a data item including a given character string, and the program is for realizing on the computer apparatus an operating environment which comprises the steps of:

performing an upper search on data items to be searched based on a condition which is different from partial matching of the character string;

counting the data items to be searched which are narrowed down by the upper search;

determining whether the number of the data items to be searched which are narrowed down obtained by counting is not more than the prescribed number of searchable items by partial matching; and performing a lower search by partial matching of the character string in relation to a result obtained by determining whether the number of the data items to be searched which are narrowed down is not more than the number of searchable items by partial matching.

A seventh aspect is directed to a method for supplying through a communications circuit a program to be executed in a computer apparatus for searching a database in which a plurality of data items are accumulated and extracting a data item including a given character string, and the program is for realizing on the computer apparatus an operating environment which comprises the steps of:

performing an upper search on data items to be searched based on a condition which is different from partial matching of the character string;

counting the data items to be searched which are narrowed down by the upper search;

determining whether the number of the data items to be searched which are narrowed down obtained by counting is not more than the prescribed number of searchable items by partial matching; and performing a lower search by partial matching of the character string in relation to a result obtained by determining whether the number of the data items to be searched which are narrowed down is not more than the number of searchable items by partial matching.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Described below is an embodiment of the present invention referring to the drawings.

Figure 1:
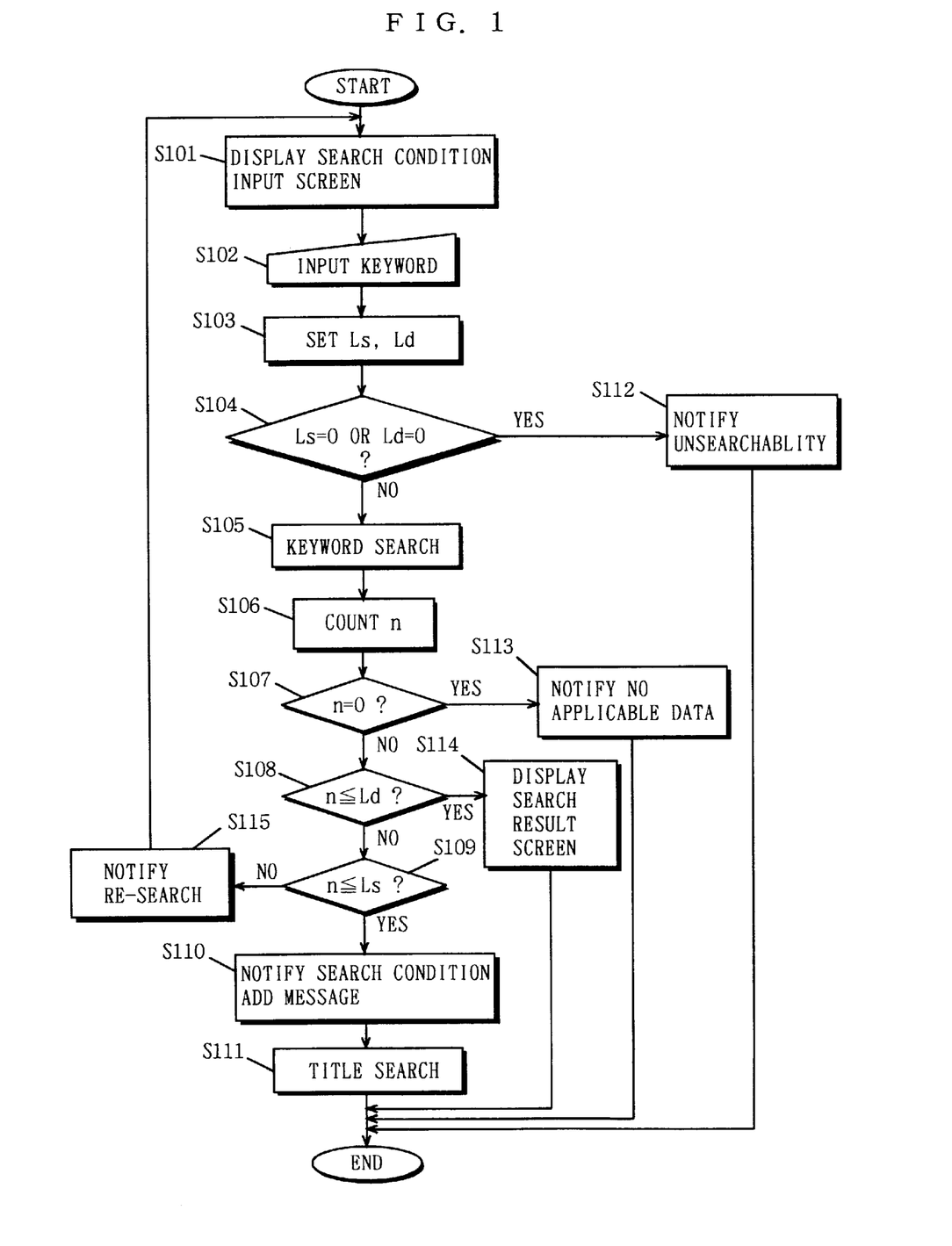
FIG. 1 is a flow chart showing a data searching method according to an embodiment of the present invention.
Figure 2:
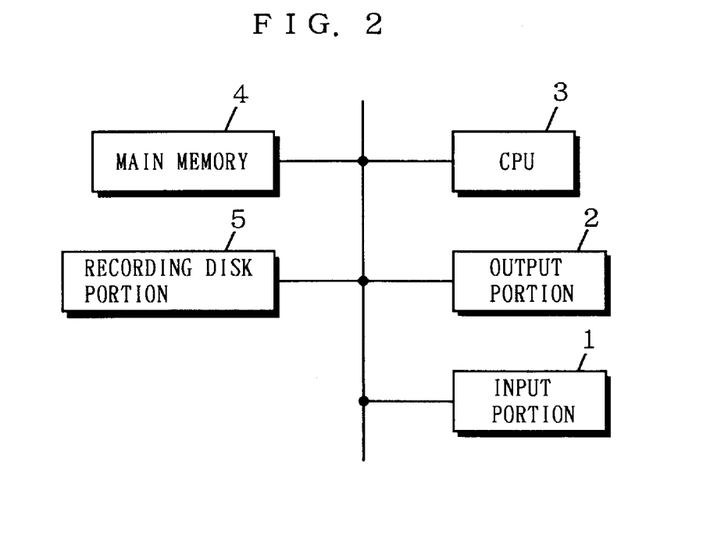
FIG. 2 is a block diagram showing an example of structure of a data searching apparatus to which the data searching method in FIG. 1 is applied.

FIG. 1 is a flow chart showing a data searching method according to an embodiment of the present invention. FIG. 2 is a block diagram showing an example of structure of a data searching apparatus to which the data searching method in FIG. 1 is applied. The apparatus in FIG. 2 includes an input portion 1, an output portion 2, a CPU 3, main memory 4, and a recording disk portion 5.

The input portion 1 is for inputting search conditions, various commands, etc., composed of a keyboard and mouse, for example. The output portion 2 is for displaying an input screen, a search result screen, etc., composed of a D/A converter, a frame buffer, and a monitor, for example. The CPU 3 operates data search processing process, a window system for screen display, etc., of the present invention. The main memory 4 stores a software program for executing the data search processing process of the present invention, intermediate results of the search processing, etc. The recording disk portion 5 stores a database to be searched, a file required for searching, etc., composed of a magnetic disk, for example.

The above software program is stored in a portable recording medium such as a CD-ROM and a floppy disk to be provided, or is supplied through a communications circuit for the apparatus in FIG. 2. The provided or supplied software program is once stored in the recording disk portion 5 (or, may be initially stored in the recording disk portion 5 of the apparatus in FIG. 2), and then transferred to the main memory 4 to be executed by the CPU 3.

Now, stored in the recording disk portion 5 of the apparatus in FIG. 2 is a database of a collection of photographs in which photo data items on the order of 150,000 are registered. Each photo data item includes, in addition to its title, several indexes. Examples of these indexes are a keyword such as "food", "Japanese food", "Ethnic food", and the date of publishing the data item.

Prior to searching by partial matching of a character string (here, title search), the apparatus in FIG. 2 performs another search capable of a high-speed search (here, keyword search), thereby narrowing down the data to be searched on title. Then, the apparatus is characterized in that it executes the title search only when the number of data items obtained by narrowing down is such that the title search can be quickly completed. Described below are details referring to the flow chart in FIG. 1.

Figure 9:
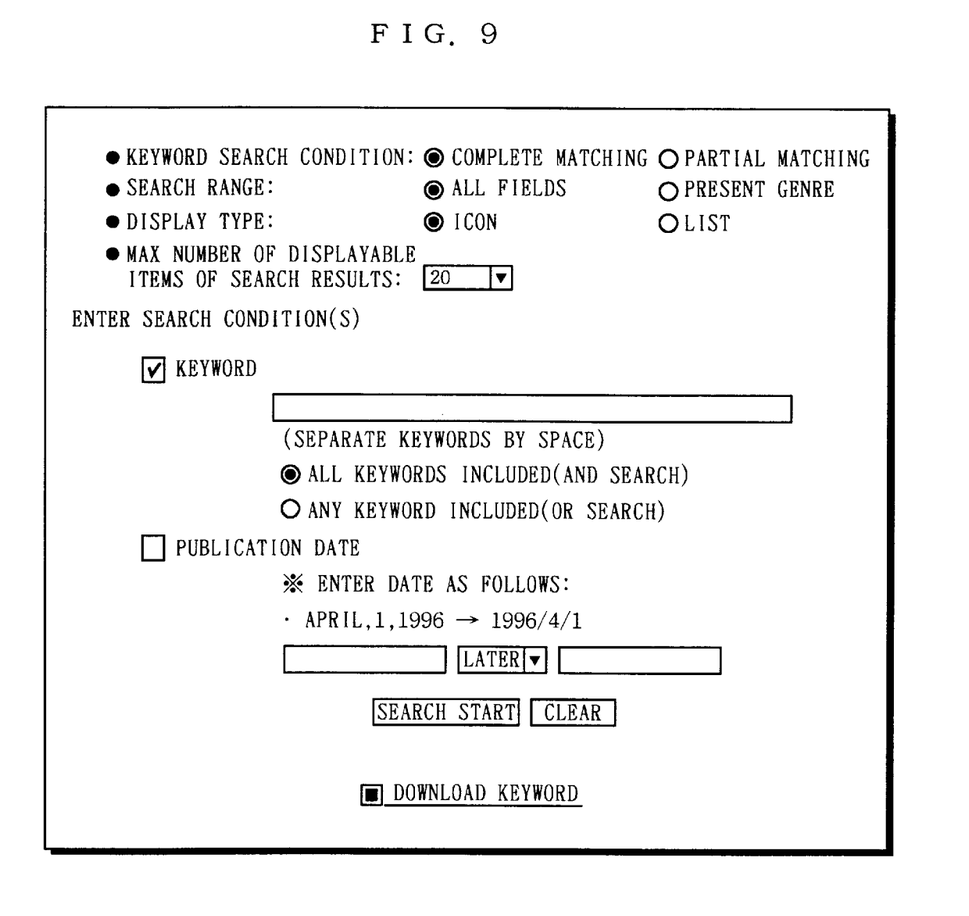
FIG. 9 is a diagram showing a search condition input screen (no entry) displayed in step S101 in FIG. 1.

First, a "search condition input screen" as shown in FIG. 9 is displayed through the output portion 2 (step S101). In response to the instructions by the screen, an operator enters a search condition (here, a prescribed keyword) through the input portion 1 (step S102), and then presses a search start button.

In response, the CPU 3 first performs processing for determining the number of searchable items by partial matching Ls (hereinafter abbreviated as Ls, if necessary), and the number of displayable items Ld (hereinafter abbreviated as Ld, if necessary) (step S103). The number of searchable items by partial matching Ls is the number of data items such that the apparatus in FIG. 2 can complete the search by partial matching of a character string within a predetermined time period. On the other hand, the number of displayable items Ld is the number of data items such that the apparatus in FIG. 2 can complete display of search results within a predetermined time period.

Figure 3:
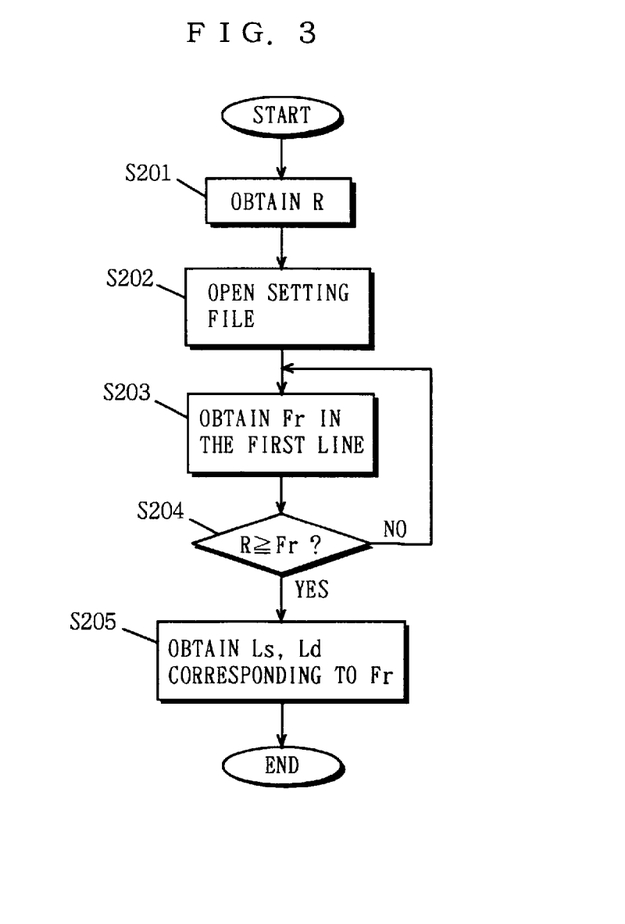
FIG. 3 is a flow chart showing details of processing of step S103 in FIG. 1.

FIG. 3 is a flow chart showing details of processing of step S103 in FIG. 1. Described below is step S103, that is, processing for determining Ls and Ld referring to the flow chart in FIG. 3.

The CPU 3 first obtains a current operating ratio R of the CPU 3 itself (step S201). The relations between the operating ratio R and Ls and between the operating ration R and Ld will be described later.

Figure 4:
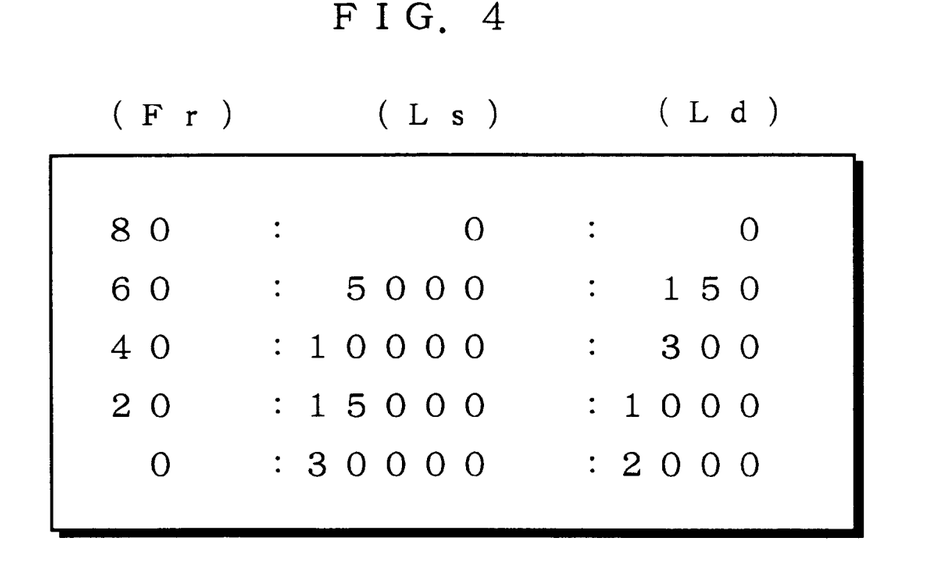
FIG. 4 is a diagram showing an example of a file for setting the number of searchable items by partial matching Ls and the number of displayable items Ld.

Stored in the recording disk portion 5 is a file as shown in FIG. 4, for example. The file in FIG. 4 is a file for setting Ls and Ld for this search based on the current operating ratio R of the CPU 3, and written therein are a plurality of operating ratios Fr (=80, 60, . . . ), and Ls (=0, 5000, . . . ) and Ld (=0, 150, . . . ) corresponding to each Fr.

The CPU 3 next opens the file in FIG. 4 (step S202). Then, the CPU 3 obtains Fr in the first line from the file (step S203) to compare it to the current operating ratio R of the CPU 3 obtained in step S201 (step S204). When R<Fr as a result of comparison, the CPU 3 returns to step S203 to obtain Fr in the first line among the remaining Fr.

When R≧Fr as a result of comparison, the CPU 3 obtains values of Ls and Ld corresponding to Fr to set these values for this search as the number of searchable items by partial matching and the number of displayable items (step S205). The processing of step S103 is now completed.

The CPU 3 next determines whether at least either Ls or Ld set in step S103 is 0 or not (step S104). When neither Ls nor Ld is 0, the CPU 3 goes on to step S105.

When at least either Ls or Ld is 0, the CPU 3 notifies the operator that the search cannot be currently performed (step S112).

The CPU 3 next starts a search on keyword inputted in step S102 (step S105). The description is provided below assuming that Ls=30000 and Ld=2000 are set in step S103.

The CPU 3 then counts the photo data items narrowed down by the search in step S105 (step S106), and then determines whether the number n obtained by counting is 0 or not (step S107). When n≠0 as a result of determination, the CPU 3 goes on to processing in step S108.

When n=0, the CPU 3 notifies the operator that data to which the keyword inputted in step S102 applies does not exist in the database in the recording disk portion 5 (step S113).

The CPU 3 next compares n obtained in step S106 to Ld set in step S103 to determine whether n≦Ld or not (step S108). When n>Ld as a result of determination, the CPU 3 goes on to step S109.

Figure 10:
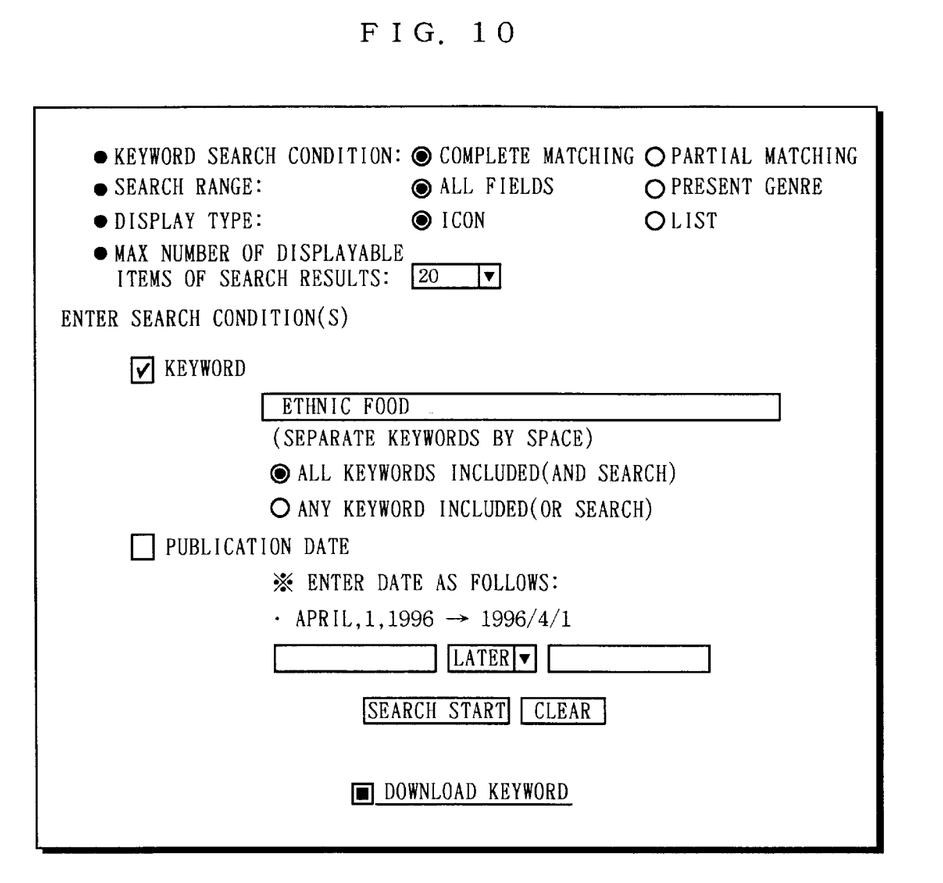
FIG. 10 is diagram showing an example of the search condition input screen (entered) displayed in step S101 in FIG. 1.
Figure 11:
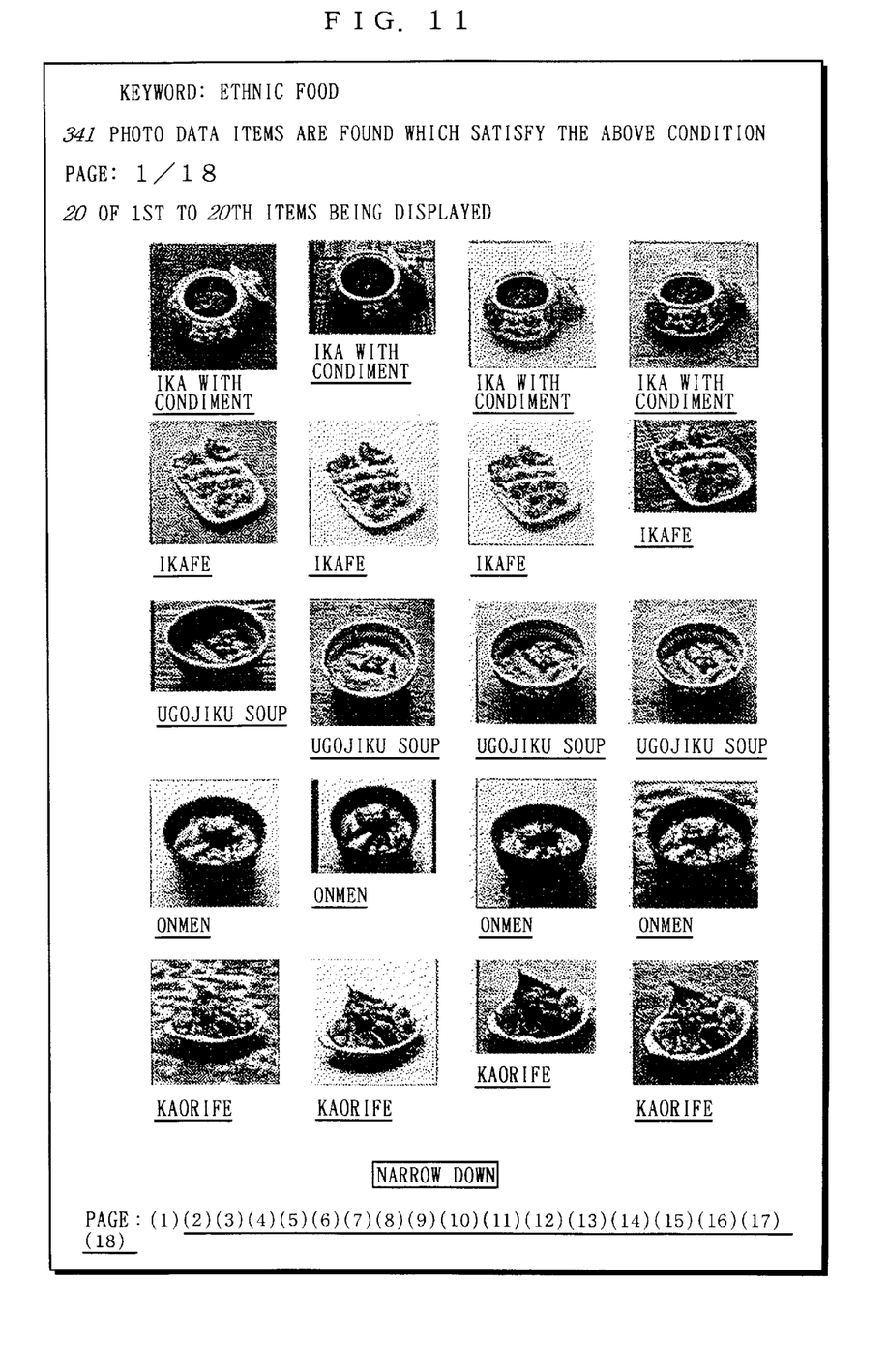
FIG. 11 is a diagram showing an example of a screen displayed in step S114 in FIG. 1 (corresponding to FIG. 10)

When n≦Ld, the CPU 3 reads out data items to which the keyword inputted in step S102 applies from the database in the recording disk portion 5 to display through the output portion 2, for example, a screen as shown in FIG. 11 (step S114). The screen in FIG. 11 is an output screen when a keyword "Ethnic food" is inputted (its input screen is shown in FIG. 10) and n=341 as a result of the search in step S105.

The CPU 3 next compares n obtained in step S106 to Ls set in step S103 to determine whether n≦Ls or not (step S109). When n≦Ls, the CPU 3 goes on to processing in step S110.

When n>Ls, the CPU 3 encourages to perform the search again because a large number of data items to which the keyword inputted in step S102 are applicable exist in the database in the recording disk portion 5 (step S115), and then returns to the processing in step S101. For example, when n=32125 as a result of the search in step S105, since the number of items exceeds the initial condition Ls=30000, the CPU 3 moves to step S115.

Figure 12:
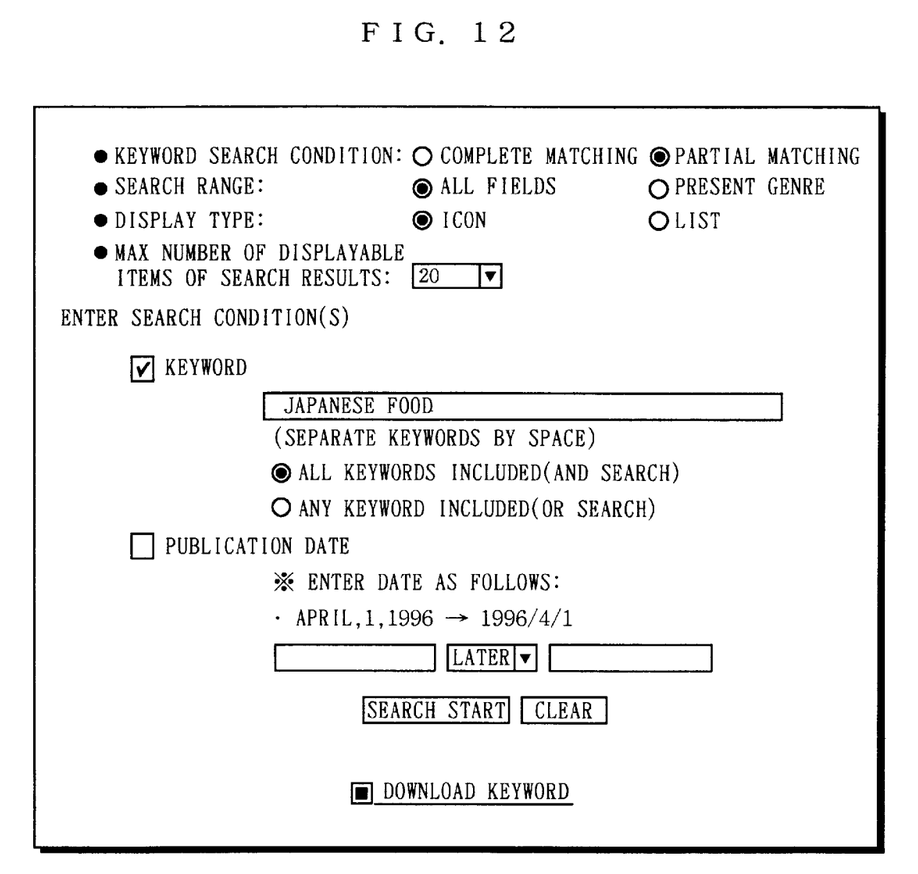
FIG. 12 is a diagram showing another example of the search condition input screen (entered) displayed in step S101 in FIG. 1.
Figure 13:
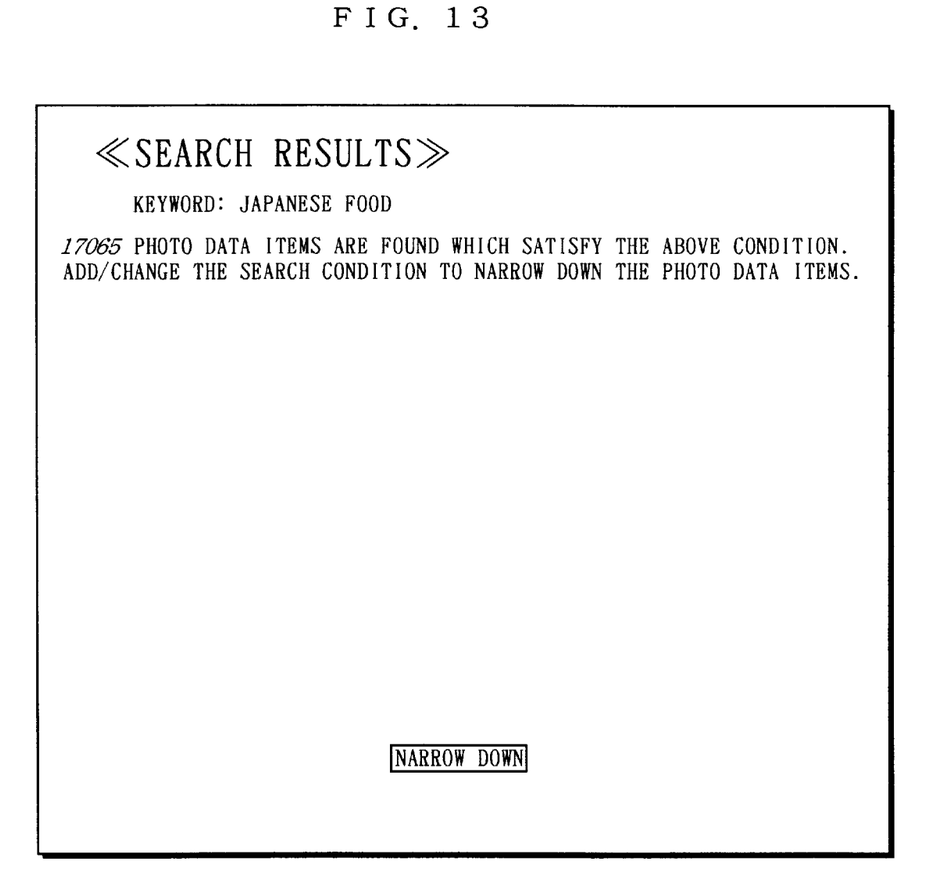
FIG. 13 is a diagram showing an example of a screen displayed in step S110 in FIG. 1 (corresponding to FIG. 12)

The CPU 3 next displays through the output portion 2, for example, a screen as shown in FIG. 13 (step S110) to encourage to further narrow down the data items by adding/changing the search condition (in this case, the title search can be performed). The screen in FIG. 13 is an output screen when a keyword "Japanese food" is inputted in step S102 (its input screen is shown in FIG. 12) and n=17065 as a result of the search in step S105.

In response, when the operator presses a "narrow down" button, the title search starts (step S111).

Figure 6:
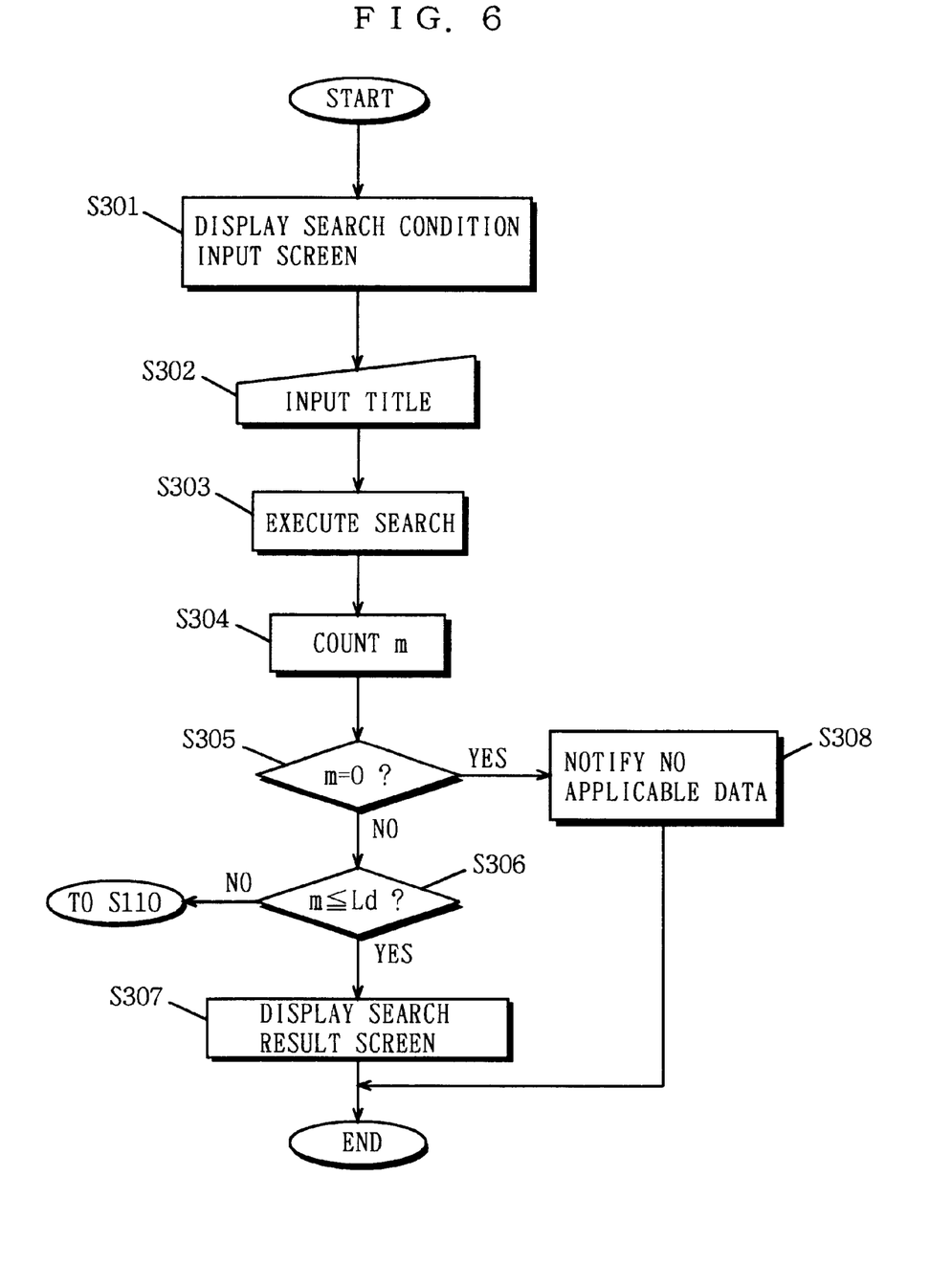
FIG. 6 is a flow chart showing details of processing of step S111 in FIG. 1.

FIG. 6 is a flow chart showing details of processing of step S111 in FIG. 1. Described below is step S111, that is, processing of the search on title referring to FIG. 6.

Figure 14:
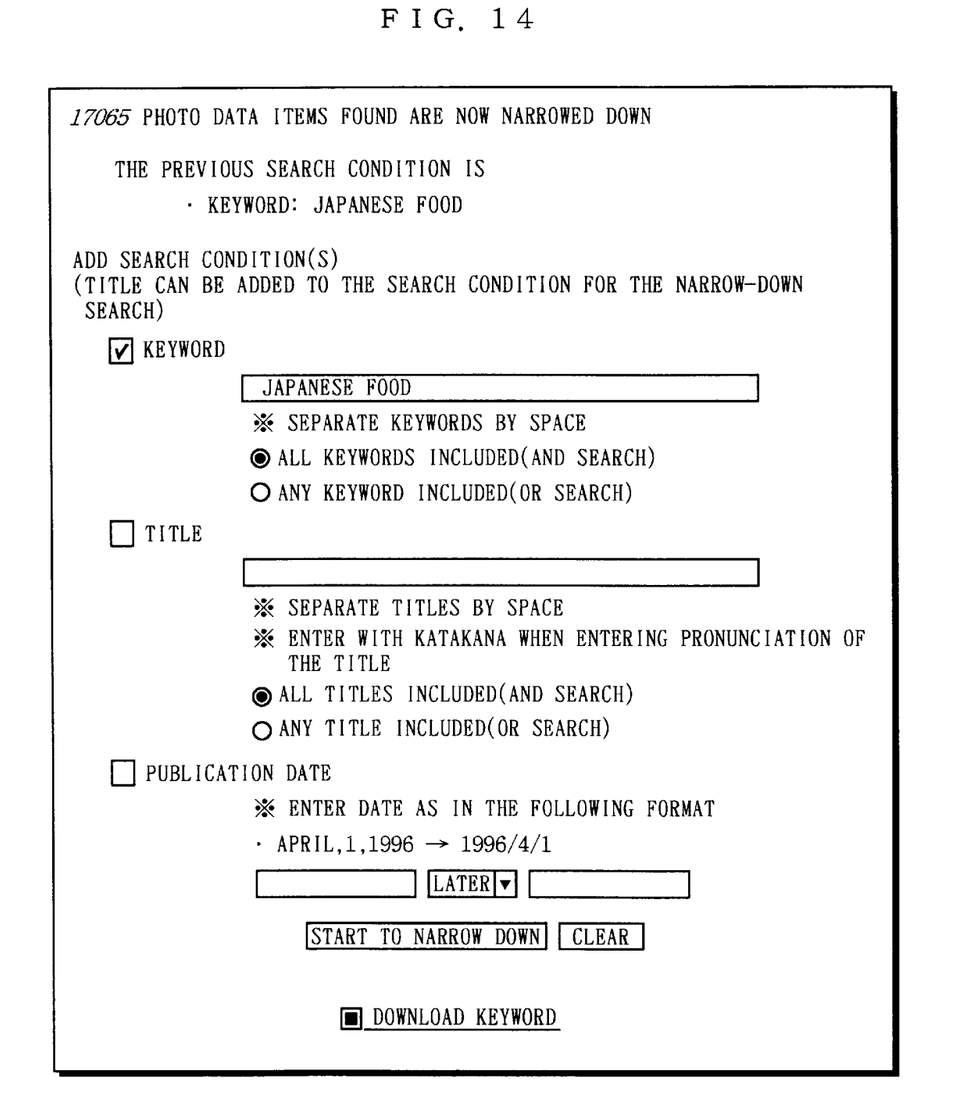
FIG. 14 is a diagram showing a search condition input screen (no entry) displayed in step S301 in FIG. 6.

The CPU 3 first displays through the output portion 2 a search condition input screen as shown in FIG. 14 (step S301) to encourage to input a title. Displayed in the screen in FIG. 14 is the keyword inputted in step S102 in FIG. 1 as it is (here, "Japanese food"). In response, when the operator enters the title (step S302), and then presses the "start to narrow down" button, the title search is executed (step S303).

In step S303, before starting the title search, the CPU 3 again executes the keyword search (here, "Japanese food") to extract a collection of data items to be searched on title from the recording disk portion 5, and develops the extracted collection of data items on the main memory 4. Then, the CPU 3 searches the collection of data items on title.

In the title search, with respect to each data item in the collection of data items developed on the main memory 4, it is verified whether the title included in the data item includes the title (character string) inputted in step S302 or not. Then, when the title includes the character string, the data item becomes (one of) search results in step S303.

The CPU 3 next counts the photo data items obtained by searching in step S303 (step S304), and then determines whether the number m obtained by counting is 0 or not (step S305). When m≠0 as a result of determination, the CPU 3 goes on to processing in step S306.

When m=0, the CPU 3 notifies the operator that no data item which includes the title character string inputted in step S302 exists in the database in the recording disk portion 5 (step S308).

The CPU 3 then compares m obtained in step S304 to Ld set in step S103 to determine whether m≦Ld or not (step S306). When m>Ld as a result of determination, the CPU 3 returns to step S110 in FIG. 1.

Figure 15:
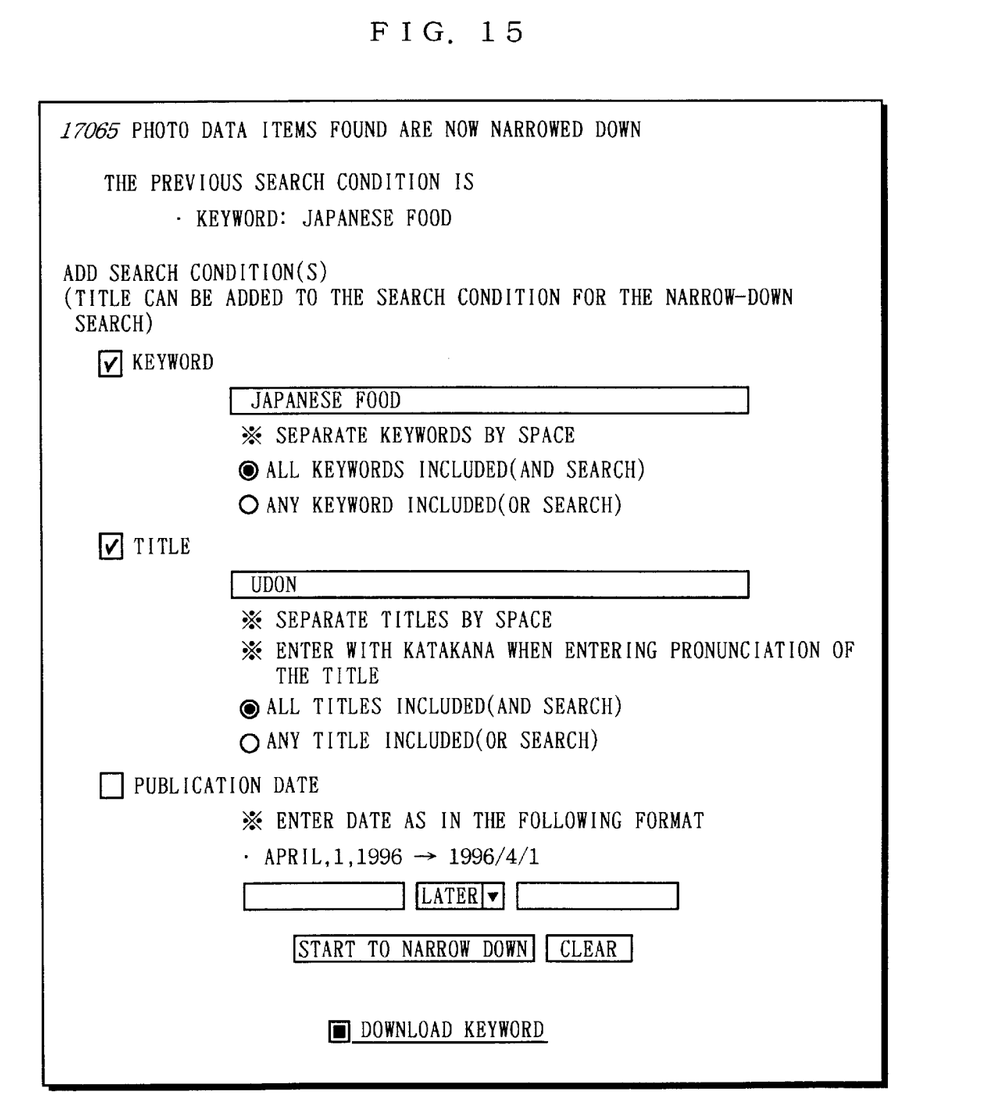
FIG. 15 is a diagram showing an example of the search condition input screen (entered) displayed in step S301 in FIG. 6.
Figure 16:
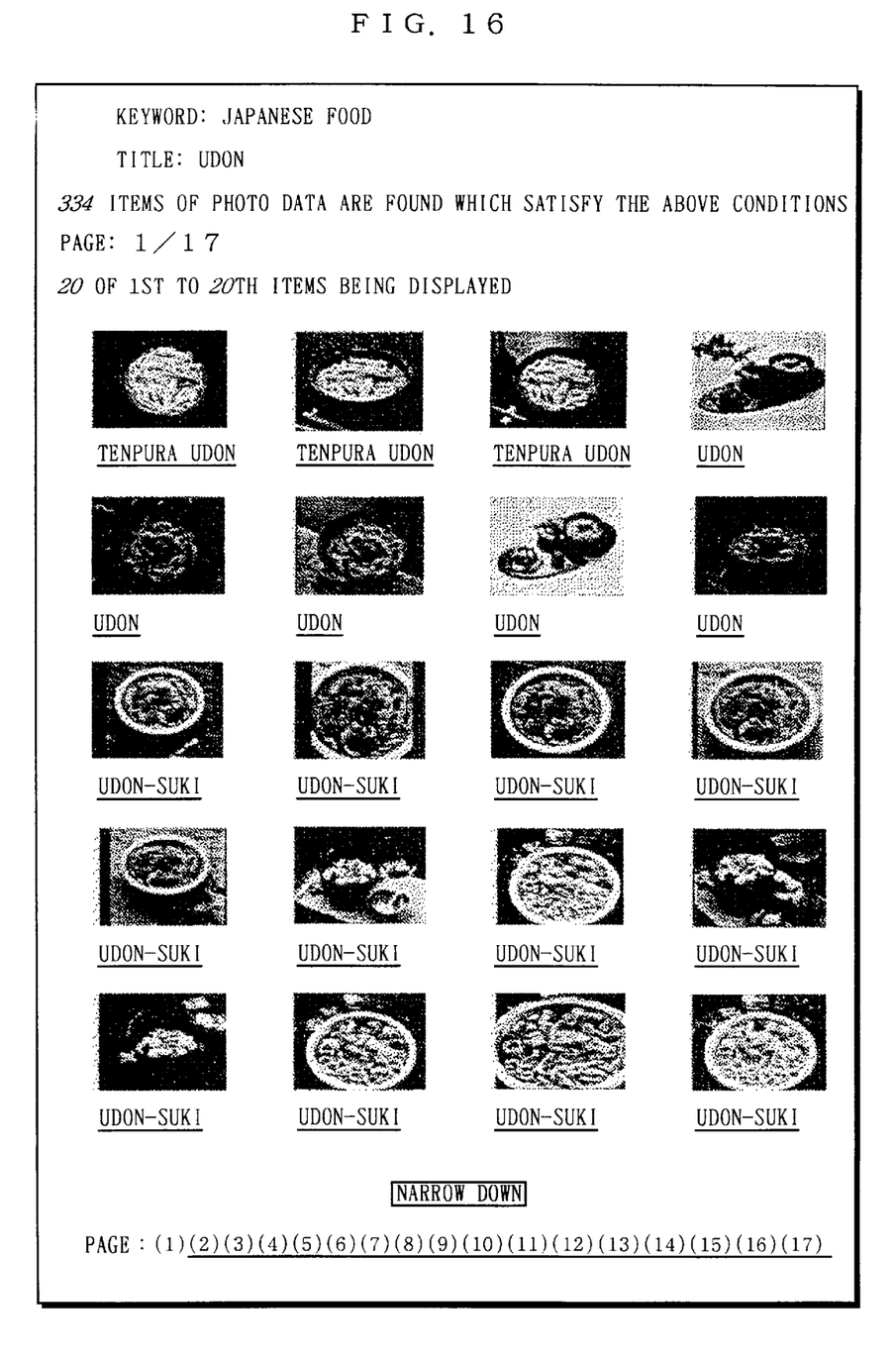
FIG. 16 is a diagram showing an example of a screen displayed in step S307 in FIG. 6 (corresponding to FIG. 15).

When m≦Ld, the CPU 3 reads out the data items which includes the title character string inputted in step S302 from the main memory 4 to display through the output portion 2, for example, a search result screen as shown in FIG. 16 (step S307). The screen in FIG. 16 is an output screen when a title character string "Udon" is inputted in step S302 (its input screen is shown in FIG. 15), and m=334 as a result of search in step S303.

As described above, in the data searching method of the present embodiment, the number of searchable items by partial matching Ls and the number of displayable items Ld are first determined based on the current operating ratio R of the CPU 3, and then the processing of narrowing down by the keyword search is performed. Next, the narrowed-down photo data items are counted, and when the number n obtained by counting satisfies Ld<n≦Ls, the processing of narrowing down by the title search is further performed. Then, the further-narrowed-down photo data items are counted, and when the number m obtained by counting satisfies m≦Ld, these photo data items are displayed.

In this way, the title search is executed only when the number of photo data items to be searched which are narrowed down by the keyword search is such number that the title search is quickly completed, thereby always sufficiently saving time required to complete searches.

Further, display is executed only when the number of photo data items to be searched which are further narrowed down by the title search is such number that displays are quickly completed, thereby always sufficiently saving time required for completing displays.

Now described is the relation between the number of searchable items by partial matching Ls and the number of displayable items Ld and the operating ratio R of the CPU 3. As described above, the number of searchable items by partial matching Ls is such number that the search by partial matching of a character string can be complete within a predetermined time, and its value varies depending on how much the CPU 3 is currently loaded, that is, depending on the current operating ratio R of the CPU 3. Therefore, the appropriate number of searchable items by partial matching Ls is determined by the operating ratio R of the CPU 3 as a parameter, preventing time required to complete searches from becoming long as a result of heavy loads on the CPU 3 at the time of searching. This can be also applied to the number of displayable items Ld.

Therefore, in step S103, the file where the plurality of operating ratios Fr (=80, 60, . . . ) and Ls and Ld corresponding to each Fr are written (FIG. 4) is stored in the recording disk portion 5 to set Ls and Ld in accordance with the current operating ratio R of the CPU 3 referring to the file.

Instead of the file as in FIG. 4 being provided in advance, the appropriate Ls and Ld in accordance with the current operating ratio R of the CPU 3 may be calculated for each search by, for example, the CPU 3.

In addition, factors which might affect the time required to complete searches include the number of search processes (currently being executed) P. The number of search processes P is the number of other search processes already being executed by the CPU 3 at the time of starting the search, and the appropriate Ls and Ld may be determined by the number of search processes P as a parameter.

Figure 5:
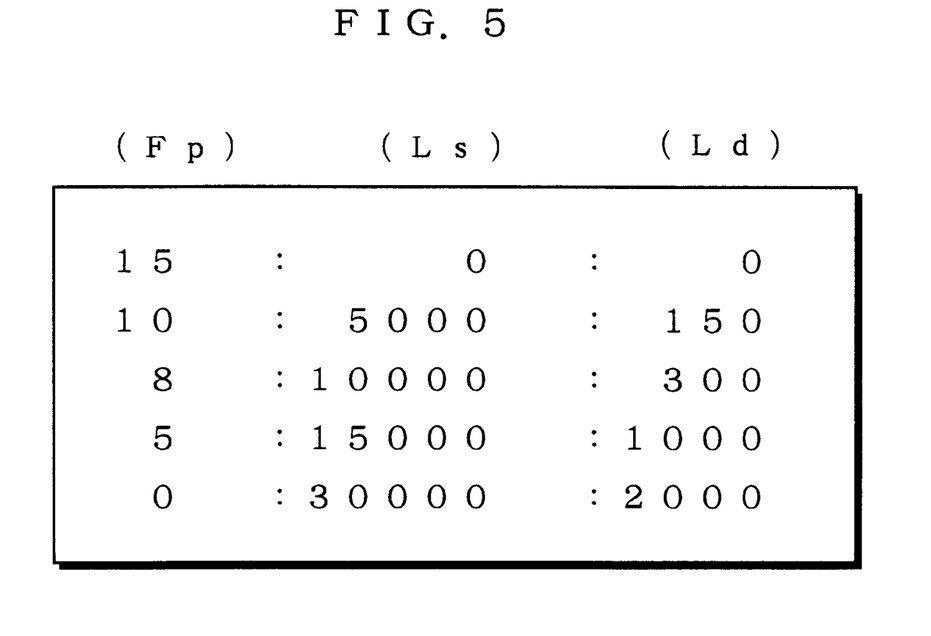
FIG. 5 is a diagram showing another example of the file for setting the number of searchable items by partial matching Ls and the number of displayable items Ld.

In this case, in the above step S103, instead of the file in FIG. 4, a file as shown in FIG. 5 where a plurality of the numbers of search processes Fp (=15, 10, . . . ) and Ls and Ld corresponding to each Fp are written is stored in the recording disk portion 5, and Ls and Ld are set in accordance with the number of search processes (currently being executed) P referring to the file. The details are shown in FIG. 7.

Figure 7:
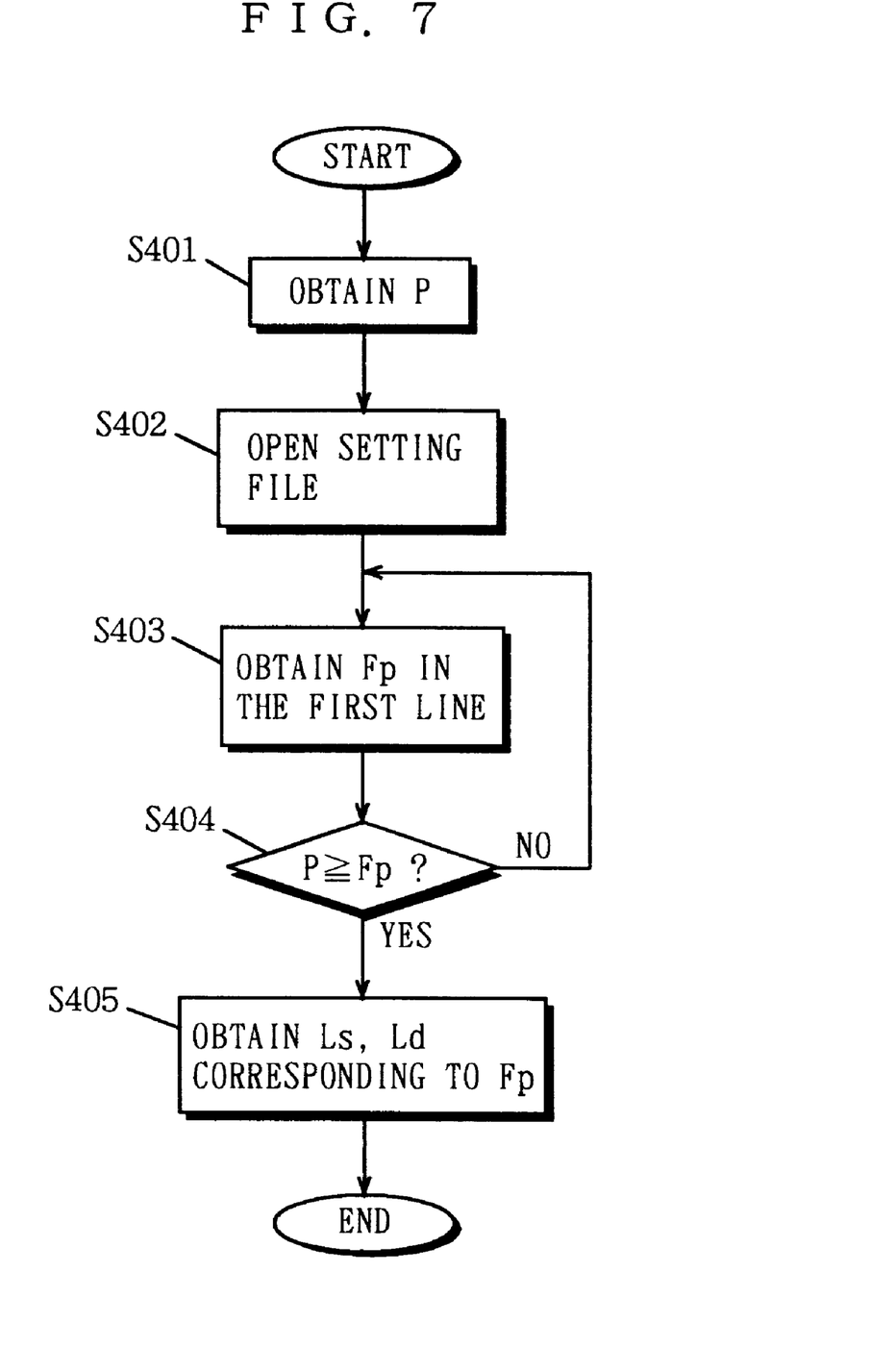
FIG. 7 is a flow chart showing details of processing when Ls and Ld are set based on P instead of R in FIG. 3.

FIG. 7 is a flow chart showing details of processing when, instead of Ls and Ld being set based on the current operating ratio R of the CPU 3 in step S103 in FIG. 1, Ls and Ld are set based on the number of search processes P. Described below is the processing referring to FIG. 7.

The CPU 3 first obtains the number of search processes P (step S401). Stored in the recording disk portion 5 is, for example, the file as shown in FIG. 5. The file in FIG. 5 is the file for setting Ls and Ld for this search based on the number of search processes P, and written therein are the plurality of the numbers of search processes Fp (=15, 10, . . . ) and Ls (=0, 5000, . . . ) and Ld (=0, 150, . . . ) corresponding to each Fp.

The CPU 3 next opens the file in FIG. 5 (step S402). Then, the CPU 3 obtains Fp in the first line from the file (step S403) to compare it to the number of search processes P obtained in step S401 (step S404). When P<Fp as a result of comparison, the CPU 3 returns to step S403 to obtain Fp in the first line among the remaining Fp.

When P≧Fp as a result of comparison, the CPU 3 obtains Ls and Ld corresponding to Fp from the file to set these to the number of searchable items by partial matching and the number of displayable items for this search (step S405). The processing in step S103 is now completed.

Instead of the file as in FIG. 5 being provided in advance, the appropriate Ls and Ld in accordance with the number of search processes (currently being executed) P may be calculated for each search by, for example, the CPU 3.

Ls and Ld may be determined based on the operating ratio R of the CPU 3 and the number of search processes P. In this case, the file in FIG. 4 and the file in FIG. 5 are stored in the recording disk portion 5, and referring to these files, the number of searchable items by partial matching Ls1 and the number of displayable items Ld1 based on the operating ratio R of the CPU 3 and the number of searchable items by partial matching Ls2 and the number of displayable items Ld2 based on the number of search processes P are obtained. Then, the smaller values between Ls1 and Ls2 and between Ld1 and Ld2 are each set as Ls and Ld for this search. The details are shown in FIG. 8.

Figure 8:
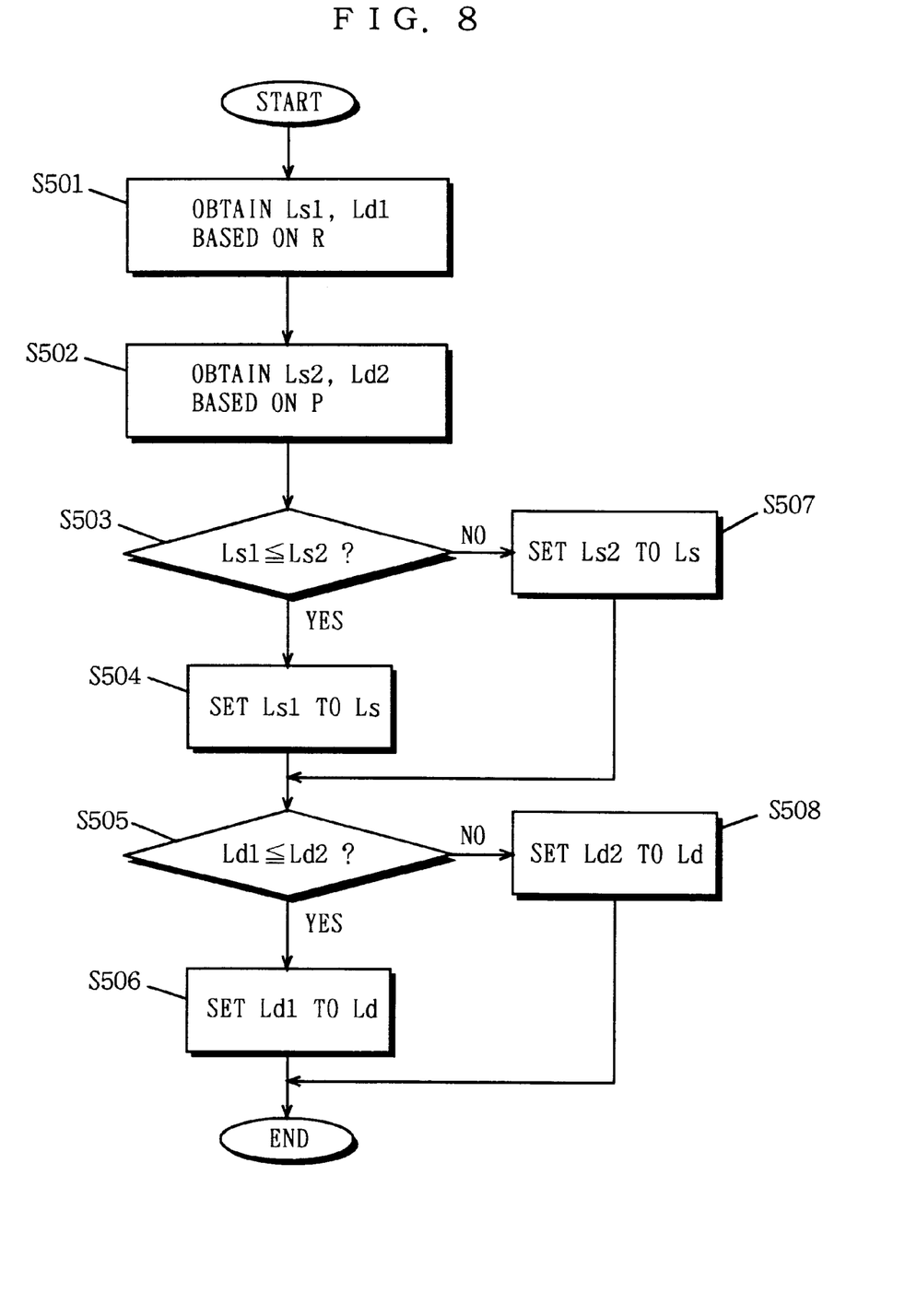
FIG. 8 is a flow chart showing the details of processing when Ls and Ld are set based on R and P instead of R in FIG. 3.

FIG. 8 is a flow chart showing details of processing when, instead of Ls and Ld being set based on the operating ratio R of the CPU 3, Ls and Ld are set based on the operating ratio R of the CPU 3 and the number of search processes P. Described below is the processing referring to FIG. 8.

The CPU 3 first obtains Ls1 and Ld1 based on the current operating ratio R of the CPU 3 (step S501). The processing is the same as described using FIG. 3. Next, the CPU 3 obtains Ls2 and Ld2 based on the number of search processes (currently being executed) P (step S502). The processing is the same as described using FIG. 7.

The CPU 3 next compares Ls1 to Ls2 (step S503). When Ls1≦Ls2 as a result of comparison, Ls1 is set to Ls for this search (step S504), and when Ls1>Ls2, Ls2 is set to Ls (step S507).

The CPU 3 next compares Ld1 to Ld2 (step S505). When Ld1≦Ld2 as a result of comparison, Ld1 is set to Ld for this search (step S506), and when Ld1>Ld2, Ld2 is set to Ld (step S508). The processing of step S103 is now completed. Therefore, the number of scenes where time required to complete searches is long further decreases.

While the invention has been described in detail, the foregoing description is in all aspects illustrative and not restrictive. It is understood that numerous other modifications and variations can be devised without departing from the scope of the invention.

What is claimed is:

1. A method of searching data within a database in which a plurality of data items are accumulated and extracting a data item including a given character string, comprising the steps of:

performing a first search on the data items based on a condition other than a partial matching of the given character string;

counting a number of said data items that are narrowed down by said first search;

determining whether the number of said data items that are narrowed down is not more than a prescribed number of searchable data items by partial matching; and performing a second search by partial matching of said given character string in relation to said determining whether the number of said data items that are narrowed down is not more than said prescribed number of searchable items by partial matching.

2. The method of searching data according to claim 1, wherein said prescribed number of searchable data items by partial matching is a number such that said second search can be completed within a predetermined time.

3. The method of searching data according to claim 2, further comprising the step of setting said prescribed number of searchable data items by partial matching in relation to a current operating ratio of a CPU that performs said second search.

4. The method of searching data according to claim 2, further comprising the step of setting said prescribed number of searchable data items by partial matching in relation to a current number of search processes being executed by a CPU that performs said second search.

5. The method of searching data according to claim 1, further comprising the steps of:

counting a number of said data items that are further narrowed down by said second search;

determining whether the number of said data items that are further narrowed down is not more than a prescribed number of displayable items; and displaying data of search results in relation to said determining whether the number of data items that are further narrowed down is not more than said prescribed number of displayable items.

6. A recording medium that records a program to be executed in a computer apparatus for searching within a database in which a plurality of data items are accumulated and extracting a data item including a given character string, the program, when executed, causes said computer apparatus to perform the steps of:

performing a first search on the data items based on a condition other than a partial matching of the given character string;

counting a number of said data items that are narrowed down by said first search;

determining whether the number of said data items that are narrowed down is not more than a prescribed number of searchable data items by partial matching; and performing a second search by partial matching of said given character string in relation to said determining whether the number of said data items that are narrowed down is not more than said prescribed number of searchable items by partial matching.

7. A method for supplying through a communications circuit a program to be executed in a computer apparatus for searching within a database in which a plurality of data items are accumulated and extracting a data item including a given character string, the program, when executed, causing said computer apparatus to perform the steps of:

performing a first search on the data items based on a condition other than a partial matching of the given character string;

counting a number of said data items that are narrowed down by said first search;

determining whether the number of said data items that are narrowed down is not more than a prescribed number of searchable data items by partial matching; and performing a second search by partial matching of said given character string in relation to said determining whether the number of said data items that are narrowed down is not more than said prescribed number of searchable items by partial matching.

8. A method of searching data within a database in which a plurality of data items are accumulated and of extracting a data item including a given character string, comprising the steps of:

(a) search and extracting a data item on a conditions other than a partial matching of said given character string within said database;

(b) further searching and extracting a data item on a condition of partial matching of said given character string from the collection of data items extracted by the step (a);

(c) counting a number of said data items extracted by the step (b);

(d) determining whether the number counted in the step (c) is not more than a prescribed number of displayable items; and (e) displaying said data items extracted by the step (b) in related to said determinating in the step (d).

* * * * *